Oct. 3, 1961

G. FÖRSTER 3,003,027

CIRCUIT ARRANGEMENT FOR DEMODULATING AND SUBSEQUENTLY AMPLIFYING TELEVISION SIGNALS MODULATED ONTO A CARRIER

Filed July 15, 1957

INVENTOR

GERHARD FÖRSTER

BY Frank R. Jifani

AGENT 3,003,027
Patented Oct. 3, 1961

3,003,027

CIRCUIT ARRANGEMENT FOR DEMODULATING AND SUBSEQUENTLY AMPLIFYING TELEVISION SIGNALS MODULATED ONTO A CARRIER

Gerhard Förster, Hamburg-Stellingen, Germany, assignor to North American Philips Company, Inc., New York, N.Y., a corporation of Delaware Filed July 15, 1957, Ser. No. 671,868
3 Claims. (Cl. 178—7.3)

Figures 1, 2:
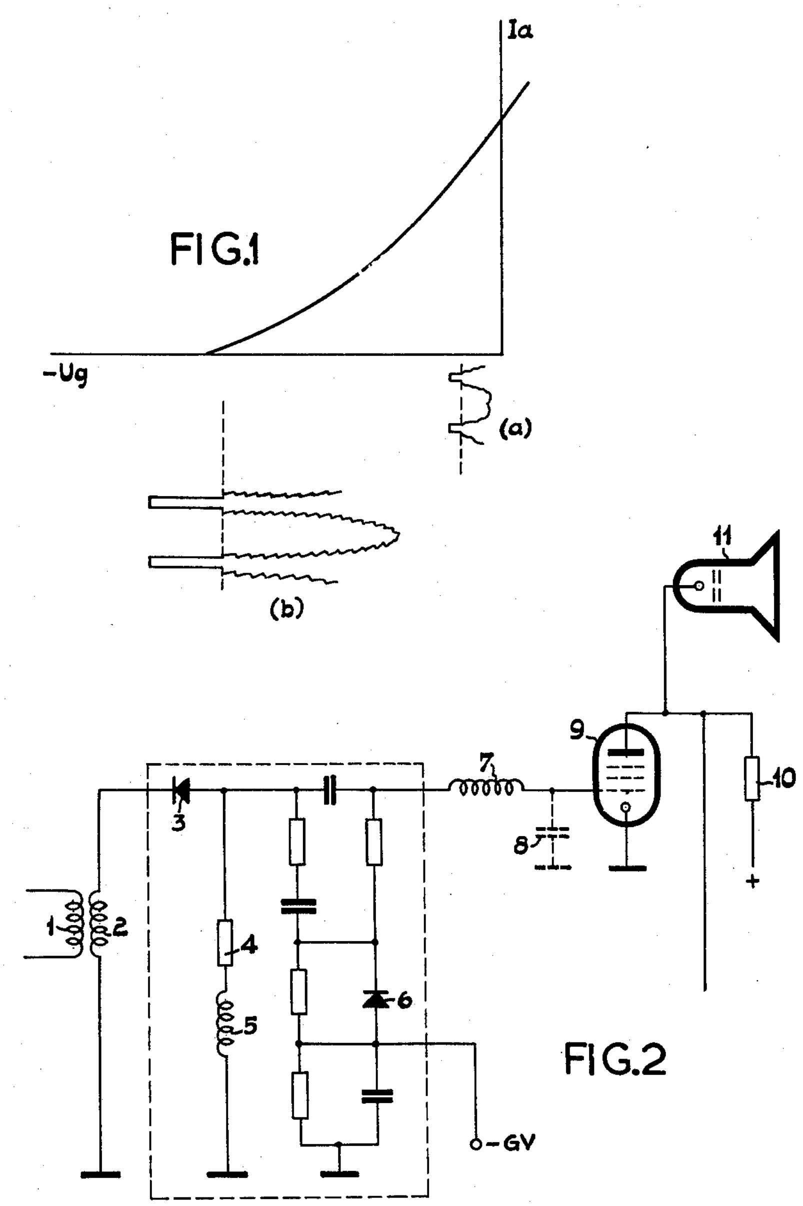

In a circuit arrangement for demodulating and subsequently amplifying television signals modulated onto a carrier, it is known to connect the demodulator diode conductively to the grid of the series-connected amplifier valve, the diode being connected so that the demodulated signal goes negative. In this case, the cathode of the video-tube may be earthed.

In this circuit arrangement, the direct-current component of the video-signal between the demodulator and the amplifier valve is retained thus obtaining a satisfactory transmission of the average picture brightness. However, the working point at the grid of the amplifier valve is subject to considerable variations, as shown in FIG. 1, representing the anode current-grid voltage curve of an electron tube. In the case of a weak signal (*a*), the steep part of the curve is operated on, while in the case of a strong signal (*b*) there may even be overdrive of the tube, the synchronisation pulses then being greatly adversely affected or even suppressed. This is particularly objectionable if separation of the synchronisation pulses occurs after the video-amplifier tube. Therefore, the video-signal should be stabilized so that a value corresponding approximately to the synchronisation-pulses, for example their peaks or their base (black level) is stabilized to a working point at the beginning of the video-amplifier characteristic.

In particular, the black value of the video-signal (dash lines in FIGS. 1*a* and *b*) should remain as accurately as possible at the same point of the characteristic. This point is adjustable by means of the brightness control so that it corresponds also to the black level on the picture tube.

The illustrated amplitude variation at the output of the demodulator might be diminished with the aid of a circuit arrangement for automatic gain control. In practice, however, it is found that this is not always feasible without much complication and at any rate not invariably to a sufficient degree.

Therefore, it is known to connect after the video-demodulator a device adjusting a reference value of the video-signal, preferably the black value, to a fixed level preferably also constituting the working point for the video-amplifier valve.

It is further known to connect a correcting network between the demodulator and the input electrode of the amplifier valve in order to correct the phase and/or frequency characteristic, and to connect a charging capacitor for the intermediate frequency- and high-frequency rectification directly behind the demodulator diode. This charging capacitor constitutes the input-parallel-capacitor of the network which is preferably followed by a series-inductance and the output-parallel-capacity of which is constituted by the input impedance of the amplifier valve.

The sum of said parallel-capacities should be as small as possible. In known circuit arrangements, the device for maintaining the black level has been connected directly in front of the grid of the amplifier valve, thus appreciably increasing the output parallel capacity of the correcting filter and impairing the characteristic of said device.

Researches, on which the present invention is based, have revealed that the natural capacity of the black level circuit may be used to advantage as a charging capacity for the demodultor so that an increase in overall capacity of the device can be avoided without interfering with its operation.

In a circuit arrangement for demodulating and subsequently amplifying television signals modulated onto a carrier in which after the demodulator and in front of the video-amplifier valve a reference value, preferably the black level or the peak value of the synchronization pulses of the video signal, is adjusted to a fixed level by means of a reference circuit, and in which a charging capacitor connected after the demodulator, also constitutes the input parallel capacity of a following correcting network, a particularly simple and suitable arrangement obviating the aforesaid disadvantages is obtained, if, according to the invention, the reference circuit is connected directly after the demodulator and its capacity, particularly its leakage capacity, serves as a charging capacitor for the demodulator.

In order that the invention may be readily carried into effect, an example will now be described in detail with reference to the accompanying drawing.

In FIG. 2, the video-signal modulated intermediate-frequency oscillations of a primary winding 1 are supplied through an intermediate-frequency transformer to a secondary winding 2, one end of which is earthed and the other end of which is connected to a rectifier 3 This rectifier is loaded with a resistor 4 which may be earthed through an inductance 5.

The output of rectifier 3 is connected to an arrangement known per se for stabilizing the video-signal to a reference value, in the present case the black-level. In this arrangement, the direct current component is first separated from the video-signal and subsequently reintroduced by peak rectification by means of an auxiliary diode 6. A fixed part of the voltage thus obtained and corresponding to the peak value of the video-signal, which part may, for example, correspond to the black-level or the peak value of the synchronization pulses of said video-signal, is brought to a fixed level by applying a constant negative bias GV. By correctly rating the connected resistors, it is thus obtained that the working point of the video-tube with regard to a signal corresponding to the black-level or the peak value of the synchronization pulses is adjusted practically independently of the signal strength at a fixed point of the characteristic, as determined by the bias.

According to the invention, this known black-level circuit arrangement, or any other circuit arrangement, serves for re-introduction of the direct current component or stabilization to black-level of the synchronization pulse peaks, or an intermediate value, more particularly together with its leakage capacities, serves as a charging capacitor for the demodulator diode 3. This permits said capacity, which may attain comparatively high values by shielding the black-level circuit and, if desired, the diode 3, to be used to advantage.

It is followed by a series-inductance 7 which together with the "charging capacitor" of the diode 3 and the input capacity 8 of the amplifier valve 9 constitutes a correcting network for correcting the frequency- and/or phase-characteristic of the video-amplifier, in particular at high frequencies.

The anode of the amplifier valve 9 is connected through resistor 10 to the positive terminal of the supply earthed at its other end, and further to the cathode of a picture tube 11.

What is claimed is:

1. A television receiver circuit comprising a source of television signals having a reference level and modulated on a carrier, a demodulator connected to demodulate said television signals and requiring a charging capacitance at its output for proper operation thereof, circuit means for setting the reference level of signals applied thereto at a fixed value, said circuit means having an inherent capacitance, means connecting said circuit means to the output of said demodulator thereby to set the reference level of said television signals at a fixed value and to serve as the sole charging capacitance of said demodulator, and a signal correcting network connected to said output of said demodulator and requiring an input capacitance, said inherent capacitance of the circuit means further serving as said input capacitance.

2. A circuit as claimed in claim 1, in which said correcting network comprises an inductance connected in the path of said signals, and means having a shunt capacitance connected in shunt with respect to said signals at the signal output of said inductance.

3. A television receiver circuit comprising a source of television signals having a reference level and modulated on a carrier, a diode, means applying said signals to one electrode of said diode, circuit means for setting a reference level of signals applied thereto at a fixed value, said circuit having an input terminal, a control voltage output terminal, and having an inherent capacitance, means connecting said input terminal to the other electrode of said diode whereby said inherent capacitance serves as the charging capacitance for said diode, a signal correcting network having an input circuit and an output circuit, means connecting said input circuit to said other electrode whereby said inherent capacitance serves as an input capacitance of said network, an amplifying device having an input electrode with an inherent shunt capacity, means connecting said output circuit to said input electrode, and means applying said control voltage to said input electrode.

References Cited in the file of this patent

UNITED STATES PATENTS

| | | |
|---|---|---|
| 2,157,170 | Grundmann et al. | May 9, 1939 |
| 2,240,281 | Ballard | Apr. 29, 1941 |
| 2,289,948 | Wilson | July 14, 1942 |
| 2,302,520 | Bingley | Nov. 17, 1942 |
| 2,515,763 | Downie | July 18, 1950 |
| 2,776,338 | Avins | Jan. 1, 1957 |

OTHER REFERENCES

Milton S. Kiver, Television Simplified, 5th edition, D. Van Nostrand Co., Inc., 1955, page 182 (Copy in Div. 41).

UNITED STATES PATENT OFFICE
CERTIFICATE OF CORRECTION

Patent No. 3,003,027 October 3, 1961

Gerhard Förster

It is hereby certified that error appears in the above numbered patent requiring correction and that the said Letters Patent should read as corrected below.

Column 4, line 1, after "the" insert -- sole --.

Signed and sealed this 31st day of July 1962.

(SEAL)
Attest:

ERNEST W. SWIDER
Attesting Officer

DAVID L. LADD
Commissioner of Patents